US007653625B1

(12) United States Patent
Frankel et al.

(10) Patent No.: US 7,653,625 B1
(45) Date of Patent: Jan. 26, 2010

(54) METHOD FOR VALIDATION OF PROPER OWNERSHIP FOR RESALE OF GOODS

(76) Inventors: Fred Frankel, 1118 W. Cypress Dr., Pompano Bch, FL (US) 33069; Allen David Hertz, 12784 Tulipwood Cir., Boca Raton, FL (US) 33428; Henrietta Frankel, 1118 W. Cypress Dr., Pompano Bch, FL (US) 33069

( * ) Notice: Subject to any disclaimer, the term of this patent is extended or adjusted under 35 U.S.C. 154(b) by 148 days.

(21) Appl. No.: 11/480,656

(22) Filed: Jul. 1, 2006

(51) Int. Cl.
 *G06F 17/30* (2006.01)
(52) U.S. Cl. .............................. 707/6; 705/27; 705/75
(58) Field of Classification Search .............. 707/6, 707/104, 10; 705/27, 75, 42, 37
 See application file for complete search history.

(56) References Cited

U.S. PATENT DOCUMENTS 5,299,116 A * 3/1994 Owens et al. ............... 705/28
5,429,391 A * 7/1995 White, II ..................... 283/70
5,955,952 A * 9/1999 Bergman et al. ......... 340/573.1
5,983,238 A * 11/1999 Becker et al. ............ 707/104.1
6,266,651 B1 * 7/2001 Woolston ..................... 705/27
2003/0050891 A1 * 3/2003 Cohen ......................... 705/42
2004/0019609 A1 * 1/2004 Orton, III et al. ........ 707/104.1

* cited by examiner

*Primary Examiner*—Mohammad Ali
*Assistant Examiner*—Thuy (Tiffany) Bui
(74) *Attorney, Agent, or Firm*—Allen D. Hertz

(57) ABSTRACT

A method and apparatus is disclosed using the internet (or similar) to provide, publish and maintain a database for stolen items. The method and apparatus further disclose the utilization of this database as a backbone for an internet portal, providing for automated contact of interested parties, automated e-commerce for replacement of assets, and immediate distribution of published information. The preferred embodiment would provide a means for extracting the information from entered police reports to create an all encompassing database. The present invention provides a new mechanism for deterring the selling of stolen items, increasing the potential of recovering stolen or missing items, and simplifying the claim processing process.

8 Claims, 10 Drawing Sheets

METHOD FOR VALIDATION OF PROPER OWNERSHIP FOR RESALE OF GOODS

RELATED US APPLICATION DATA

This patent application claims priority to Utility patent application Ser. No. 10/174,003 filed Jun. 18, 2002, issuing as U.S. Pat. No. 7,072,892 on Jul. 4, 2006 which claims priority to Utility patent application Ser. No. 09/562,349 filed Apr. 27, 2000, issued as U.S. Pat. No. 6,449,611 on Sep. 10, 2002 which claims priority to Provisional Patent Application 60/156,802 filed Sep. 30, 1999 and is incorporated herein by reference.

FIELD OF THE INVENTION

The invention relates to a business model or central operation using the global media such as the internet to provide and disseminate a central data base of stolen goods, missing goods, recovered goods, missing persons, fugitives or activation of automated recovery devices, utilizing publicity and public awareness for the services being offered. To provide a database to mitigate the access into commerce of stolen goods. By providing and supporting the data base, the business may further provide automated notification, automated temporary or permanent replacement of items, and optionally using e-commerce and/or electronic auctions for replacement.

BACKGROUND OF THE INVENTION

Currently the Law Enforcement Agencies do not have a database for stolen items or assets, much less a single national or global database. A police report is taken and filed which includes information pertaining to the stolen assets. If the reporting party has the serial number, the serial number is distributed on a teletype. A majority of smaller sized stolen items (cameras, jewelry, musical instruments, tools, firearms, etc.) are dispersed through pawn shops. Pawn shops are required to report all items taken in by using a method such as one commonly referred to as "Pawn Track". Pawn dealers are not provided a database of stolen or missing assets which they can use to determine the proper ownership of assets prior to accepting them for pawn. The recovery of stolen items distributed through pawn shops is low. Once a pawn broker fronts money for an item, if the item is determined to be stolen, the victim is required to pay the pawn broker the amount the pawn broker fronted. The current process places the recovery in a post-mortem position. The current situation present a grim picture for recovery and return of stolen or missing items.

The internet/world wide web provides a vast medium for providing information and interactions between individuals. The internet has the capability to present multimediums, including but not limited to photographs, drawings, text, video, and audio. The internet allows anyone to disseminate information immediately providing real time access for the world to view. The internet provides for free or low cost distribution of information. A user can view the information on a display, download the information to a computing device, and print the information. Computers and the internet provide a variety of methods for searching through large data bases in a expeditious manner.

Public accessible internet terminals are being placed, whereby a user may access the internet using methods similar to a public or pay telephone.

Wireless media technology provides access to the internet and will continue to advance to provide more methods to access this distribution media. These advances will allow users to access the internet from virtually anywhere at anytime.

Flea Markets and Pawn shops provide an easy outlet to distribute goods. Pawn shops are somewhat regulated and required to provide lists of received items as described above. Flea Markets are not regulated and particularly difficult to police for stolen goods, as are other unregulated outlets such as art shows, gun shows, outdoor sporting good shows, hobby shows, or other exhibitions. These unregulated sales outlets present opportunities for persons to distributed goods with unknown backgrounds.

There is currently no single place to advertise stolen or missing goods, fugitives, missing persons, or found items. There are several companies that utilize public records to locate persons. When a person is trying to avoid being found, the use of public records often becomes futile.

Publications, including newspapers, periodicals, and magazines are limited to a printed media, whereby the media does not provide a continuing data base as well as providing the information for a limited time period. Newspaper classified sections include a lost and found section, but no stolen goods section. The consumer is required to phone or fax in an advertisement which is placed in queue for printing and finally distributed at a later date. The newspaper advertisements are limited to text, whereby pictures would greatly enhance the recovery effort. Newspapers are also limited to the regions in which the newspaper is distributed. Printing and distribution of the newspapers is costly, utilizes natural or recycled resources, and energy.

Photographs and information related to missing persons are distributed through milk cartons or prints. Photographs and information related to fugitives are generally printed and posted at the US post office. These are generally limited to geographic regions in which authorities feel these persons may be located.

For stolen goods, the police provide a list (an example is referred to as Pawn Track) of stolen goods primarily for identification of stolen goods for Pawn shops to compare goods against. The list is dispersed weekly to police departments and Pawn shops with less frequent updates.

A television show "America's Most Wanted" illustrated the advantages of taking police wanted lists public and using the public to track the wanted persons. The show presented individual cases of wanted persons re-enacting the crime and presenting the possible paths of the fugitives. A television show "Unsolved Mysteries" illustrates the advantages of taking missing persons or other unsolved scenarios public and using the public to resolve the unsolved scenario.

Insurance companies or individuals generally provide a reward upon the recovery of the goods.

Recovery systems, such as LoJack™ are currently available, where the user would notify the proper agency to activate a homing device located within the object.

E-commerce provides for secured purchasing of items using the internet. The internet further provides a medium for electronic auctions. These auctions may be provided in either standard or reverse formats, as provided by such companies as E-Bay and Priceline, respectively.

The internet provides an automated means whereby a web site may post a request for price quotes for a subject item and associated e-commerce businesses may bid for the sale. The internet would provide open bidding whereby the companies would be presented the details and the lowest price of the subject item.

Email provides a mechanism for electronically transferring information. Email further provides the ability to include enclosures or attachments. It is also well understood that email may be automatically generated based upon some automated initiator.

What is desired is a means to promote lost or stolen goods whereby the method of presentation allows for the victim (individual, insurance company, or others) to promote the loss immediately and as expansively as possible, using existing media, preferably within one location or access point. A method would be desired to support potential changes to the current processes whereby the present invention would provide a mechanism for a proactive approach to increasing the risk for return and limiting the distribution of stolen assets. Alternatively, the same media, provides for an inquiring user to access the database from virtually any location using many known methods to determine the background of an item. The same may be applied to missing persons and fugitives.

Further, it is desirable to remove the unnecessary personal interface requirements to notify the insurance company, file a claim, provide a police report, and receive either the claim value, a temporary replacement, or a permanent replacement. It is desirable for the insurance company to replace the stolen or missing item at the lowest cost.

DETAILS OF THE INVENTION

The internet and associated software to present multimedia is known. The media method of presentation and associated appearances should not be considered a limiting factor for the present invention, but an enabling factor. Further, the internet provides a means for electronically transferring information such as databases, police reports, a means for providing comparative shopping, and a means for completing electronic transactions via e-commerce software.

One aspect of the present invention is to utilize the internet (or similar) as a portal for providing a data base for stolen items.

Another aspect of the present invention would be the ability for the lossee (or other interested party) to promote and publish the stolen item (loss) immediately.

Another aspect of the present invention is the ability to immediately disseminate the information globally pertaining to the lost goods.

Another aspect of the present invention is the ability to promote other unsolved scenarios, such as hit and run's, thefts, homicides, or other suspicious events in which law enforcement may have an interest.

Another aspect of the present invention is the ability to automatically notify an insurance company (or other party of interest) of the loss, whereby the insurance company could initiate claim proceedings.

Another aspect of the present invention is the ability for a portal to provide e-commerce solutions to temporarily or permanently replace the subject items.

Another aspect of the present invention is the ability for the portal to provide auctions, reverse auctions, and/or competitive shopping analysis for insurance companies to provide replacement items at the lowest cost. Since the claim should provide an adequate description of the subject item, the replacement process may be self-generating.

Another aspect of the present invention is the ability to automatically provide direct email to the claimant from either the web site providing a list of business alliances and pricing comparisons for replacement items, directly from a business alliance of the portal or other party interested in replacing the item.

Another aspect of the present invention is the ability to provide targeted banner advertising during each page view, whereby the advertisement would be based upon the category or subject of the item or items listed. This may include the type of insurance that may be utilized, the type of item being listed, or other.

Another aspect of the present invention is the ability to provide instant access anywhere, as the internet may be accessed via modems using land lines, via publicly located internet access devices, portable internet access devices (wireless), or any other means.

Another aspect of the present invention is a means to distribute the information, whereby the information may be downloaded to computing devices, placed on portable storage media such as floppy disks, compact disks, or printed for those not having access to computers or the internet.

Another aspect of the present invention is the ability to categorize the listings using any of various categories, including but not limited to item classification, location, date, method of loss (stolen or lost). Examples of the item classification would be jewelry, photography equipment, vehicles, bicycles, clothing, fine art, firearms, sporting goods, etc. Other examples would be using terms of common usage or standards already subjected within the industry, such as MPR for missing persons report. The said classifications may be further utilized for determining the respective advertisements in conjunction with the category being viewed.

Another aspect of the present invention is the ability to provide a means where the individual recovering the goods and the party seeking the goods may correspond, or utilize the agency for anonymity, whereby a case or ID number would be assigned to particular posting.

Another aspect of the present invention is the ability to provide a service whereby the internet site operating agency may act as an agent for the party seeking return of the goods for immediate correspondence with the party recovering the goods.

Another aspect of the present invention is the ability for the operating agency to acquire income based upon posting fees, rewards, and awards from the party seeking return of goods.

Another aspect of the present invention is the ability to subsidize income through advertisements posted on the web site or contributions from parties impacted.

Another aspect of the present invention is the ability to act as an agent for replacing items. This can be accomplished by competitive bids, reverse auctions, or other method of using e-commerce to purchase replacement items at a lowest possible cost. It would be recognized that alliances would benefit from this process.

Another aspect of the present invention is the ability to utilize the public as a primary agent for finding the missing goods.

Another aspect of the present invention is the ability to provide a finder's fee to a party which returns the goods.

Another aspect of the present invention is the ability to disseminate information quickly and at a low cost.

Another aspect of the present invention is the ability for all police agencies to utilize a single system.

Another aspect of the present invention is the ability to use web site(s) to activate a recovery system.

Another aspect of the present invention is the ability to utilize a computer chip or recovery circuit for tracking items, whereby the computer chips may be activated by a signal transmitted via any of many known methods, or for verification of ownership.

Another aspect of the present invention is the ability to globally provide a database for registration of ownership, tracking of ownership for objects, particularly those which may interface with computers or the internet. The object may include an electronic serial number which is compared to the data base for owner verification. Examples of such goods are digital cameras, computers, and personal data assistants. This could be similarly accomplished by including a means for providing a serial number when storing information on a device. Upon reading the stored information, the serial number may be compared against a registration site on the internet. One example would be a digital camera, storing a serial number with each picture. Manufacturers and vendors would provide a means to track and register items for such things as warranties and theft.

Another aspect of the present invention is the ability for all respective parties to maintain anonymity for protection of all parties, whereby the primary purpose of the system is to provide a means for recovering items.

Another aspect of the present invention is the ability to post found items, including those located by authorities during recovery operations for Natural disasters such as storms, earthquakes, tornadoes, and floods.

Another aspect of the present invention is the ability to attract and maintain users to view the web site using promotional tactics such as giveaways or auctions for items such as confiscated goods, etc.

Another aspect of the present invention is the ability to authenticate a submission of a police report.

Another aspect of the present invention is the ability to authenticate a sworn statement when submitting a police report.

Another aspect of the present invention is the ability to validate proper ownership of an item, via submitting information to a single database, searching said single database, and obtaining results of said search.

Another aspect of the present invention is the ability to validate proper ownership of an item, via submitting information to a single database, searching said single database, obtaining results of said search, and maintaining a record of said search.

BRIEF DESCRIPTION OF THE DRAWING

For the purpose of initially illustrating the invention, there is shown in the drawings, embodiments which are presently preferred. It should be understood, however, that the invention is not limited to the specific instrumentality and methods disclosed. It can be recognized that the figure represents a layout in which persons skilled in the art may make variations therein. In the drawings.

DETAILED DESCRIPTION OF THE DRAWING

Figure 1:
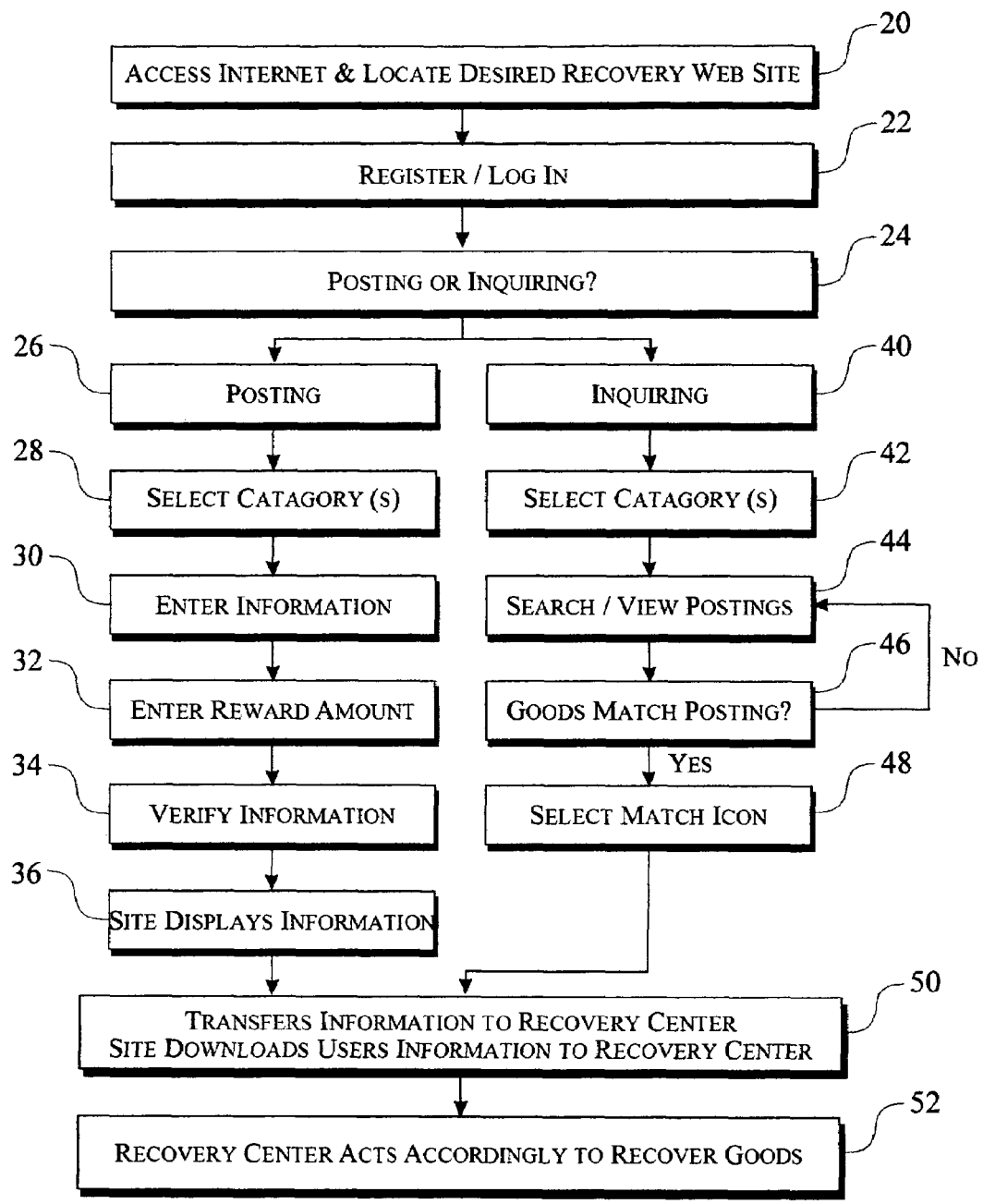
FIG. 1 illustrates a user's operational sequence of how a stolen goods/lost item web site may function.

FIG. 1 illustrates an example of a user's operational flow diagram 10 whereby in the first step 20, the user would access the internet using any of known methods including but not limited to modem, cable modem, wireless modem, or DSL. Upon accessing the internet, the user would locate a desired goods recovery web site using any of the known methods including but not limited to portal search engines, bookmarks, referrals or advertisements. In the second step 22, for a first time user, the user registers by entering requested information. The requested information would then be stored in an agency database for future use. For any subsequent use, the user would only required to complete a log in process. The log in process generally includes entering a user identification code and a password, whereby the password is requested for protecting the user and the agency. In the third step 24, the user would decide whether the user desires to post for missing goods (posting) or desires to determine if goods are being sought after (inquire). Should the user select to post missing goods the operational flow continues under step 26, posting. Should the user select inquiring, the operational flow continues under step 40, inquiring. In the forth step 28, the user selects a category to provide a means for the inquiring user to narrow the search. The categories may be based upon description of the item, approximate location where the object was last seen, potential of where the object may be found (such as a pawn shop), or any other logical category to ease searches. The categories may be provided to the user whereby the user may select predetermined categories. To ensure the sought after item may not be overlooked by an inquiring user, the posting user posting may select multiple categories. In the fifth step 30, the posting user enters the respective information to describe the goods. The web site may prompt the user as to what may be considered the optimal information. The web site may determine what the optimal information would be based upon the selected categories to ensure the goods recovered correctly belongs to the posting user. Examples of different requirements would be where electronics goods would have model and serial numbers; jewelry would not. Jewelry would be described by physical description, size, color, precious stones, engravings etc. Additionally, the user may enter other media such as pictures, sound, or any other media to improve the accuracy of recognition. The web site would interface with the posting user to determine, on a case by case basis and predetermine criteria, an award amount. In the sixth step 32, the web site displays the information and requests the posting user to verify for accuracy. For legal protection, the web site will also ask the posting user to validate actual ownership of the posted goods. The web site will then post the information in conjunction with other existing posts for inquiring users to search through. In the seventh step 34, the web site presents a preview of the post to the posting user whereby the posting user would verify and validate the information. In the eighth step 36, the web site will transfer the posted information to the respective storage locations and indices. Upon completion of the posting, an inquiring user would follow the inquiring 40 path of the operational sequence 10. In the ninth step 42, the inquiring user would select a category (including all), and continuing in the tenth step 44, using known search methods review the posting. In the eleventh step 46, the inquiring user would determine if the goods located match the subject goods described in the posting. In the twelfth step 48, the inquiring user would select the located icon. When the located icon is selected, in the thirteenth step 50, the web site automatically provides the inquiring user's contact information such that the agency may recover the subject goods. In the fourteenth step 52, the agency or recovery center acts accordingly to recover the subject goods. The described process utilizes subject goods as the primary focus. It can be recognized that the same process may be used to located missing persons and fugitives as well as found items.

Figure 2:
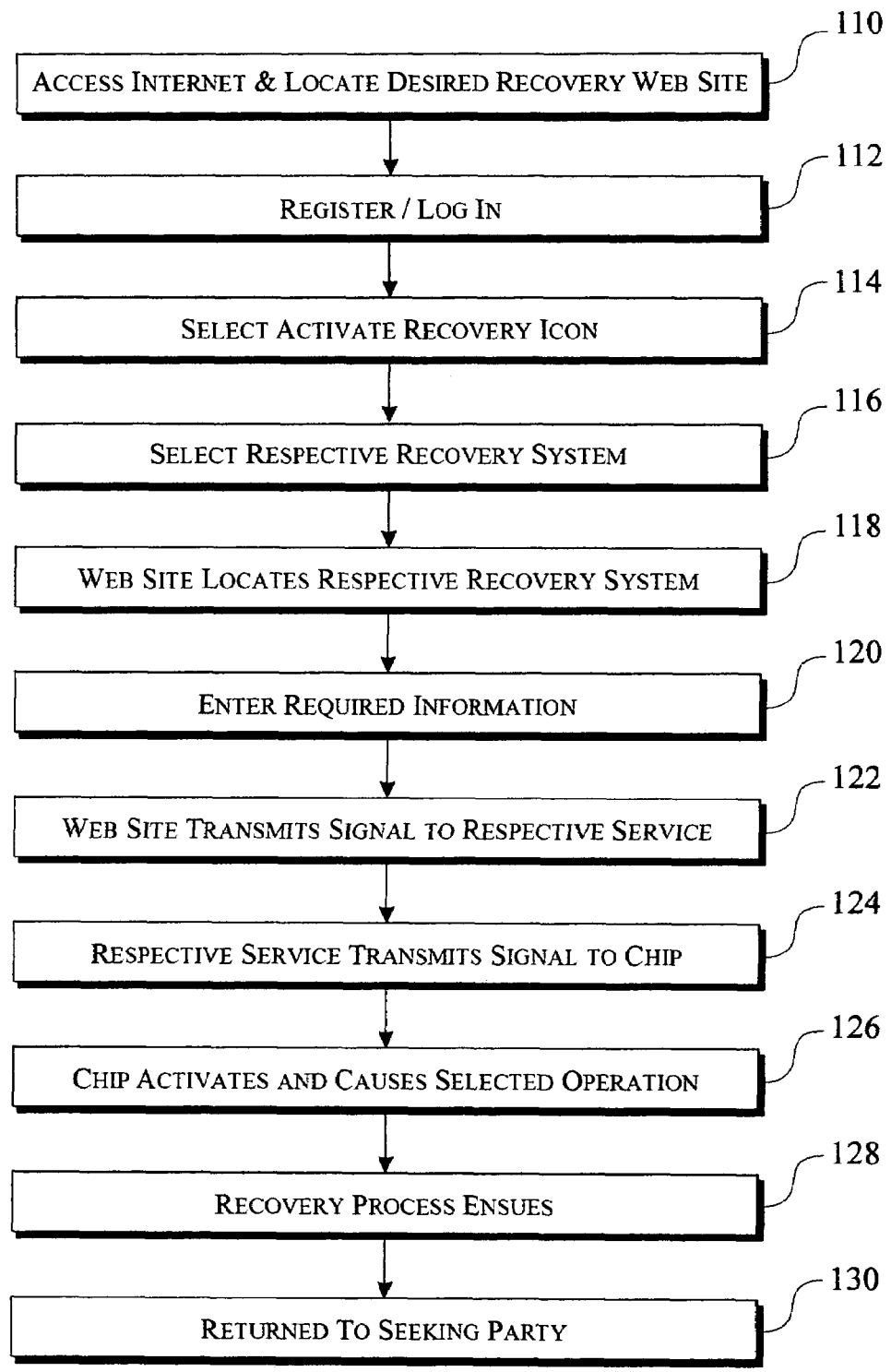
FIG. 2 illustrates a user's operational sequence of how to activate a recovery system utilizing a recovery activation web site.

FIG. 2 illustrates an automated recovery flow diagram 100 using the web site to activate an automated recovery system. In the first step 110, a seeking user would access the internet and locate the desired recovery web site using any of the known methods. In the second step 112, the seeking user would register or log in, depending upon whether this is the initial time for the user (register by providing the requested information) or a subsequent time for the seeking user. In the third step 114, the seeking user would select an activate recovery icon located on the web page. Upon the selection, the web site would record the seeking user's information from the information provided during the initial registration stored in the registered user's data base, and the recovery system requested for tracking purposes. In the forth step 116, the web site would request which recovery system is desired. In the fifth step 118, the recovery system web site requests the required information to confirm the correct owner as well as the information required to initiate the recovery system. It can be recognized that this step may be included in the agency web site, and acted on accordingly from the agency web site in the sixth step 120, the seeking user would enter the required information from the fifth step 118. The web site would verify the entered information is complete, accurate, and of correct ownership. In the seventh step 122, the web site would transmit a signal via any of the many known methods of transmission to a respective service carrier. It can be recognized that the agency, web site, or other may be the respective service carrier as well as an outside source. In the eighth step 124, the respective service transmits a signal which is received by some form of receiver, decoded by some method of decoding, and acted upon following some form of predetermined means. It is recognized that there are many methods of transmitting a signal, using wires or wireless technology, encoding and decoding a transmitted signal, and providing a means to act upon a decoded signal. One known example would be using a paging service signal which is received by a paging type receiver; a paging type decoder which decodes the received paging service signal; and a controller which utilizes the decoded signal to operate a vehicle door locking mechanism to lock or unlock vehicle doors. It can be recognized that the information may further originate from a web site, transfer using email, or any other data transmitting mechanism via modem through the internet to a desired site or terminal. The end site may include a wireless transmitter which translates the information into an encoded signal and uses an RF signal to transmit the encoded signal to the desired receiver. The receiver would decode the transmitted signal using and RF decoding technology to provide decoded data. In the ninth step 126, the received and decoded data would be compared to encrypted data such as a serial number, and if the decoded data matches the encrypted data, a recovery chip and or recovery electronic circuit, activates a desired scenario. The desired scenario would be based upon the particular object. For a vehicle, it may be desirable to flash the lights and energize the horn using relays included in an electronic recovery circuit to obtain attention until the authorities arrive. In the tenth step 128, the recovery process ensues. it can be recognized that upon activation of the recovery system, it would also be advantageous to notify the proper authorities. By creating a scenario whereby the public would recognized the scenario being unusual, it would generally draw attention to the public, whereby they would inquire to the authorities. Alternatives would be to inactivate the equipment, and preferably present a screen to call a specified access number to request help. Upon the request, the proper recovery process would ensue. In the twelfth step 130, the recovered goods would be returned to the seeking party.

Figure 3:
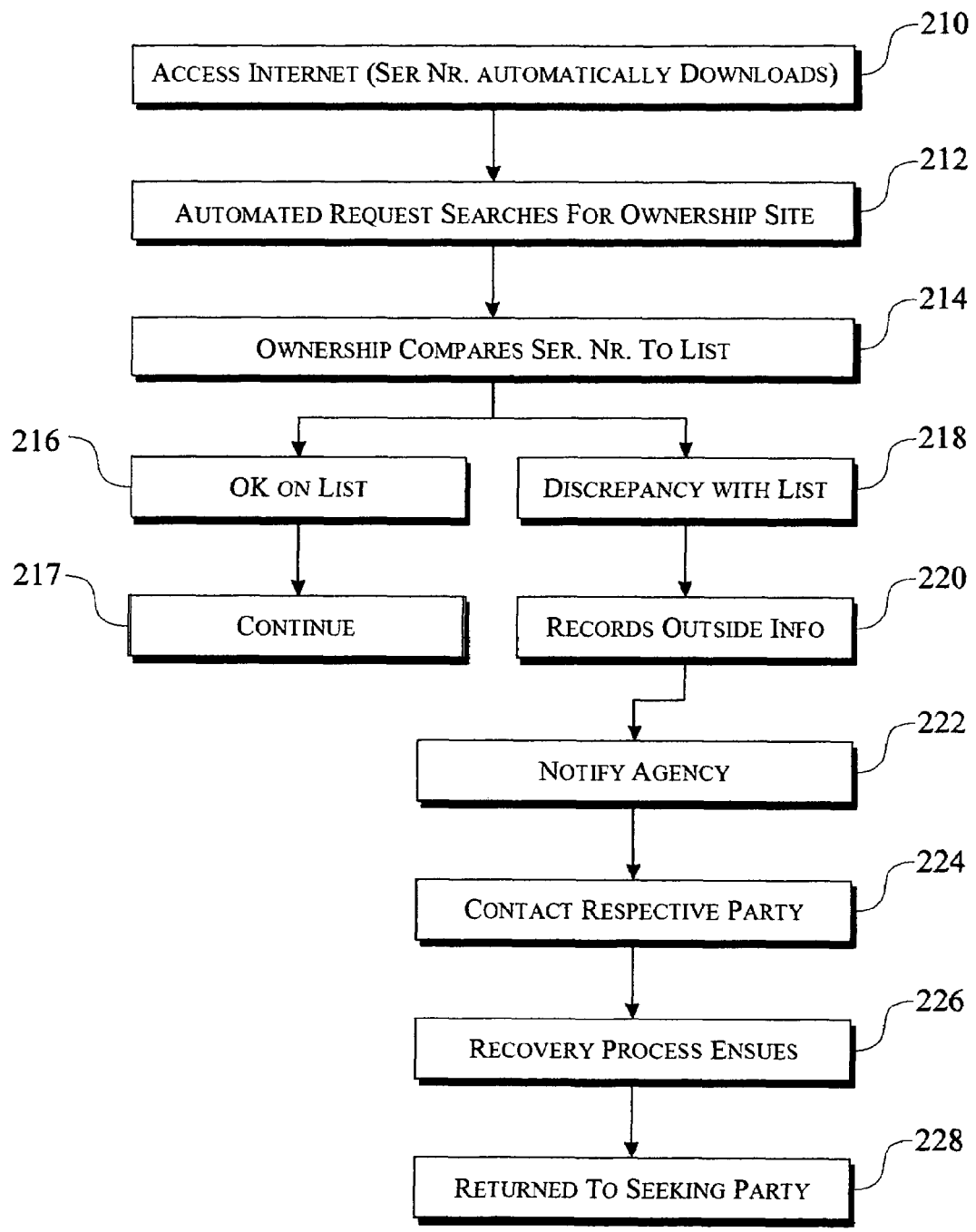
FIG. 3 illustrates a log in automated verification system using an internally coded electronic serial number.

FIG. 3 illustrates an automated ownership verification flow diagram 200, whereby an electronic serial number would be utilized to verify proper ownership or user authorization. In the first step 210, the device would transmit a signal to a desired receiver, whereby one example would be a computer logging into the internet. During the initial sequence of transmission, the device would encode an electronic identification number, and other respective information. The device would access the desired terminal, router, or other receiving/data base comparing device. The electronic identification number (EIN) (or similar) would be decoded at the terminal. In the second step 212, the EIN would be compared against a database for ownership and/or authorization. The data base is updated to provide for any change in status, should the device become stolen or missing, should the user not pay for a service, should the user desire to limit access, etc. It can be recognized that the user may be required to enter a pass code as well to verify correct user. In a third step 214, the provided information is compared against a database to determine whether the device is with the correct owner or an authorized user. Should the comparison determine an allowable scenario, the forth step 216 is enacted and in the fifth step 217, the system enables the user to continue. Should the comparison determine an unacceptable scenario, the sixth step 218 ensues, whereby in the seventh step 220, the recovery system would attempt to record any potential outside information such as dialed in phone number, RF signal receiver, or other to determine the geographic region where the device may be recovered. In the eighth step 222, the recovery system would notify the recovering agency. Upon notification, the agency would follow the respective procedure to begin recover of the item. In the ninth step 224, the agency would notify the respective parties, including the party seeking return of the goods and the party currently using the goods. The party seeking return of the goods would have provided a method for contact, whereas the party currently using the goods would not be desiring any detection. The system would utilize any of known methods of detecting where the signal is being transmitted. Since the normal interfacing would be two way transmissions, the system should have the ability to approximately locate device and further, it would behoove the system to transmit a signal to the device to activate or employ a recovering scenario within the device. The agency would use the acquired information to locate the device. In the tenth step 228, the device would be returned to the party seeking return of the goods.

Figure 4:
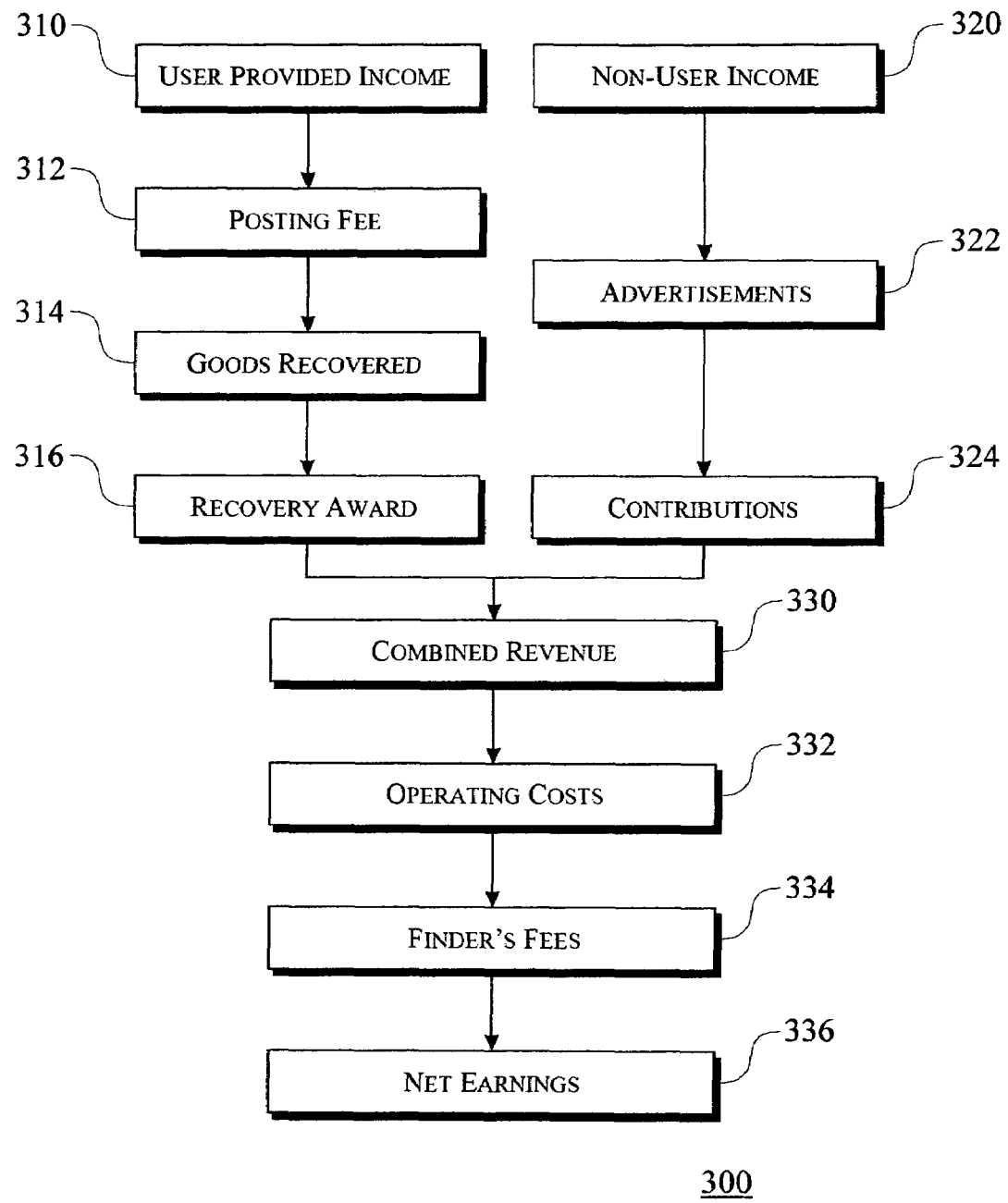
FIG. 4 illustrates a financial flow diagram of how a register/recovery business model may receive and disperse funds.

FIG. 4 illustrates a financial flow sequence 300 providing a financial means to support the operation. Revenue would be provided by two (2) primary means: in the first primary mean 310, the revenue is provided through actual users, in the second primary means 320, the revenue is provided through non-user means. The user provided means 310 may include a posting fee 312, whereby the user may be required to pay a fee to post the information. The fees may be contingent upon recovery of the goods, whereby should the goods be recovered 314, the user would be required to pay a recovery award 316 as determined and agreed upon prior to the posting. The non-user provided means 320 may include advertisements 322 or contributions 324. Target advertisers would be insurance companies, equipment manufacturers, anti-theft device manufacturers, etc. Contributions 324 may be provided by authorities such as police, sheriff, customs, FBI, etc. Additional revenue may be provided by companies upon registration of the recovery devices embedded within goods, or others. The combined revenue 330 is then subjected to operating costs 332, finder's fees 334 to determine the net earnings 336. The agency may opt to reduce posting and or recovery fees for non profit organizations and each scenario may be independently decided.

Figure 5:
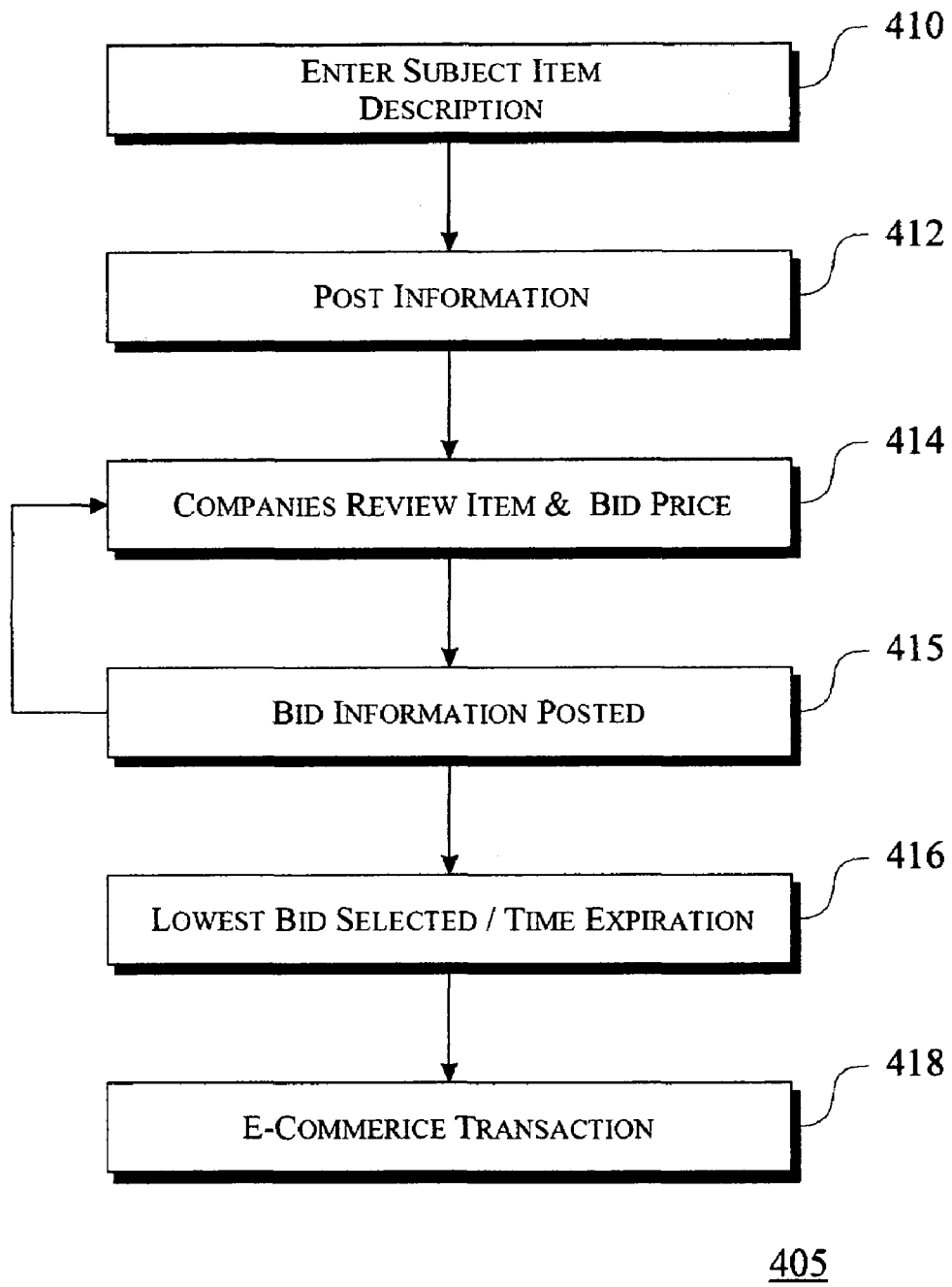
FIG. 5 illustrates a flow diagram consistent with a competitive bid process for procurement of the lowest priced item using the internet.

FIG. 5 illustrates a flow diagram consistent with a competitive bid process 405 for procurement of the lowest priced item using the internet. The competitive bid process 405 would enter a description of the subject item 410, post the information 412 on the internet, companies would review item and bid a price 414, the lowest bid information would be posted 415 on the web site. The companies may continue to review the current bid information and continue to place bids 414. When the lowest bid is reached, the time has expired, or some other trigger point is reached, the competitive bid process 405 closes with the e-commerce transaction 418. The item is then delivered to the desired location (not shown).

Figure 6:
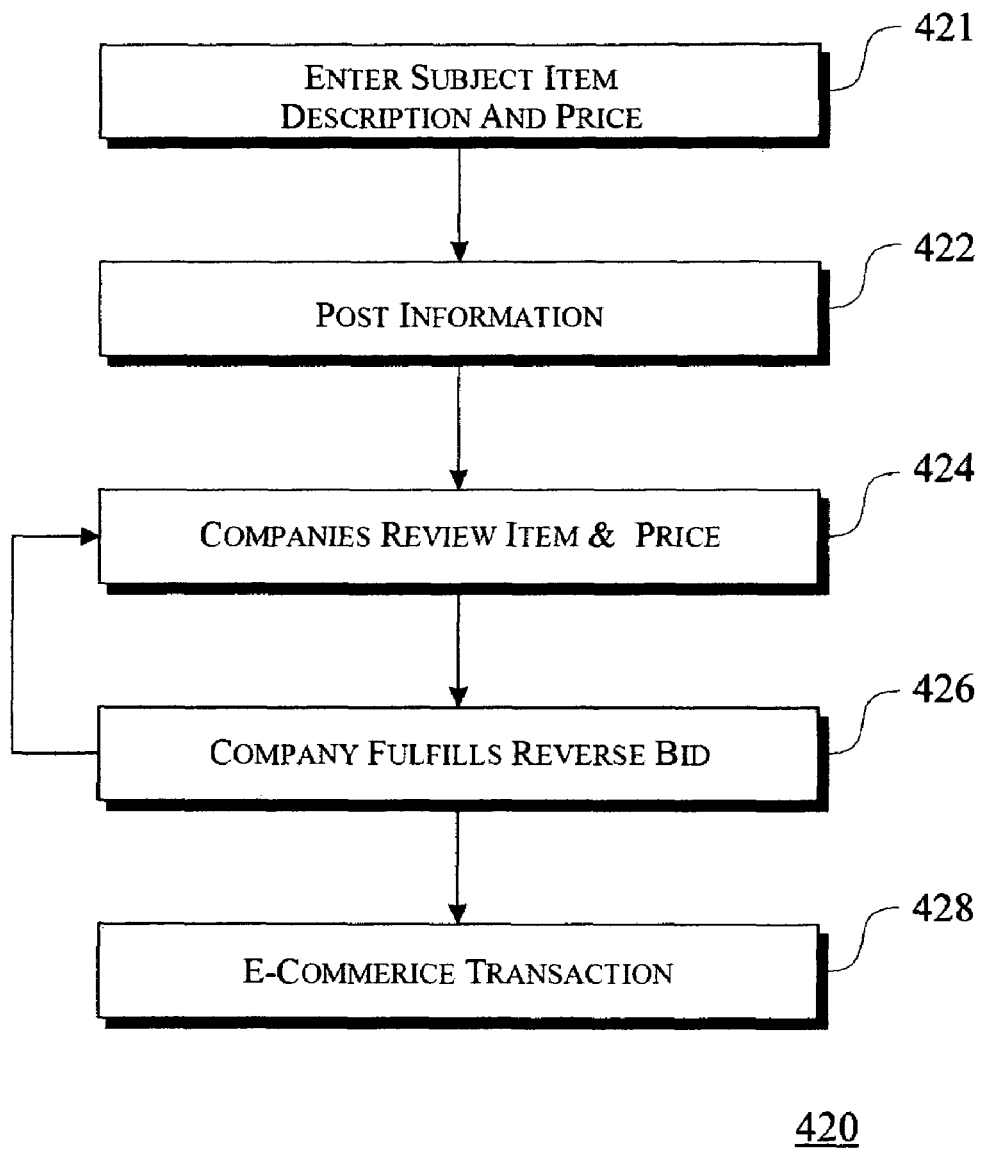
FIG. 6 illustrates a flow diagram consistent with a reverse auction process for procurement of the bid price for an item using the internet.

FIG. 6 illustrates a flow diagram consistent with a reverse auction process 420 for procurement of an item at a desirable price using the internet. The reverse auction process 420 would enter a description and desired transaction price of the subject item 421, post the information 422 on the internet, companies would review the item description and bid at that price against the current inventory 424. When a party posts the respective item at the desired price, the reverse auction process 420 closes with the e-commerce transaction 428. The item is then delivered to the desired location (not shown).

Figure 7:
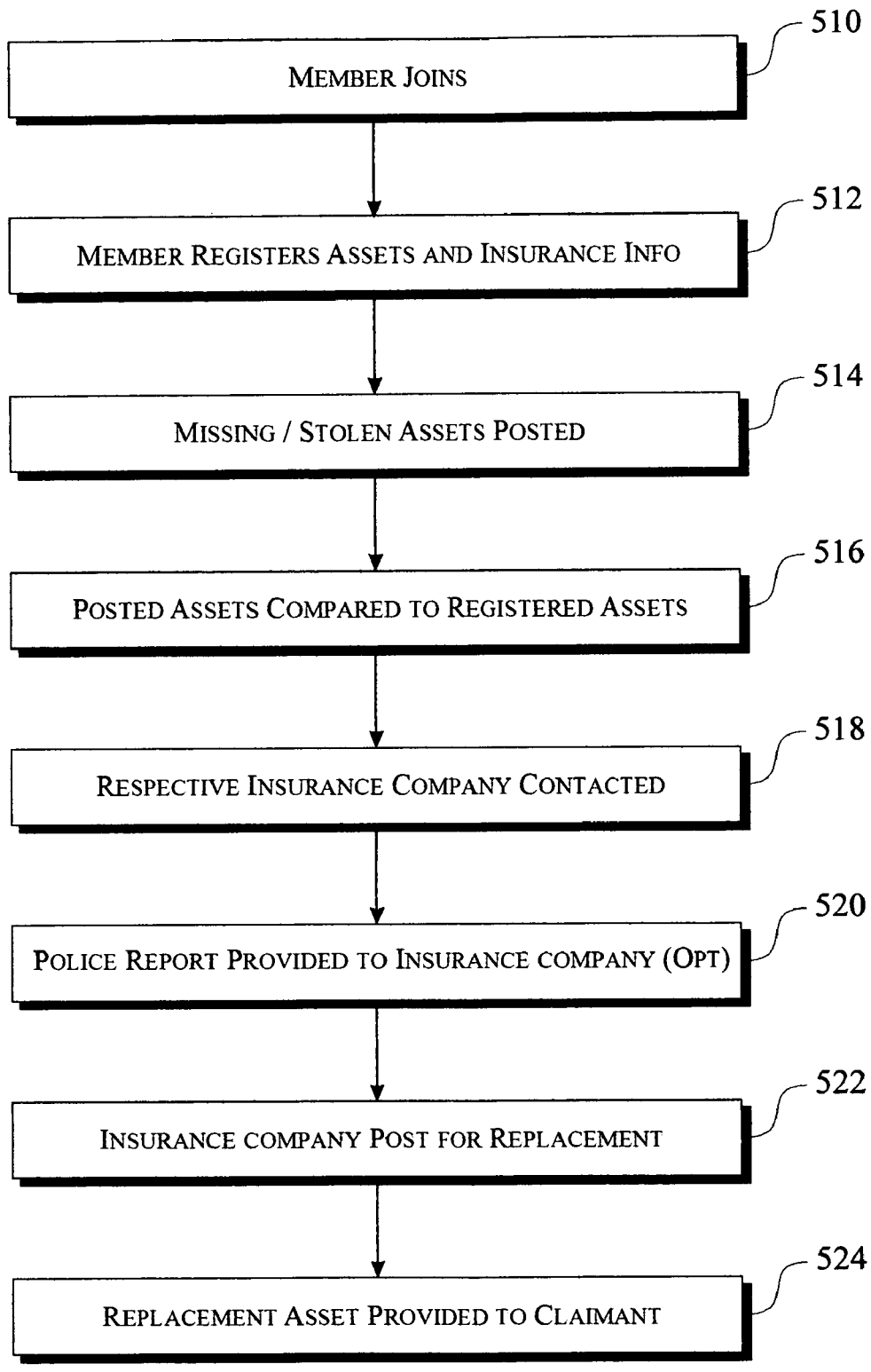
FIG. 7 illustrates a flow diagram consistent with a members pre-registration of assets and a means to notify the insurance company.

FIG. 7 illustrates a flow diagram consistent with a members pre-registration of assets and a means to notify the insurance company. A member would join 510 the registry. This may be accomplished directly or indirectly such as through the insurance company. The member would provide a listing of all desirable assets, including as much description as possible (Serial numbers, model numbers, options, features, photographs, value, etc.) and the respective insurance information, including contact information for the insurance company. The member would also provide the desirable means for compensation if a claim is made against the subject asset(s). If the member has an asset registered and the asset becomes missing, the member may use the registry to provide details of the asset to the law enforcement agencies. As each item is posted as either missing or stolen, the database would compare the item (claimant, or other) against the previously registered assets 516 and continue based upon the outcome of the comparison. Should the process identify a posted item with a previously registered asset, the system would then contact the respective insurance company 518. The web site would preferably include the capabilities for law enforcement agencies to enter police reports, with the preferred embodiment where the police reports are only entered through the web site and stored accordingly. Preferably, the missing/stolen asset information would be extracted from the police report and automatically posted to the web site. The web site would provide the capability to the insurance company to obtain a copy (hardcopy or electronic copy) of the police report, preferably automatically. The insurance company would then have sufficient information to complete a claim request (not shown) without intervention of the claimant. Should the member register as desiring automatic replacement of the asset, the insurance company may utilize any of the known e-commerce methods for acquiring replacement assets 522. These processes may include electronic bidding process 405, a reverse auction 420, or other known method of purchasing goods over the internet. Upon determining an acceptable transaction, the transaction would be completed and the replacement asset would be provided to the claimant 524. It can be recognized that the e-commerce features of the web site may be used by claimant or other user. The member would be provided additional benefits which would be considered as obvious and not patentable, and therefore not described herein.

Figure 8:
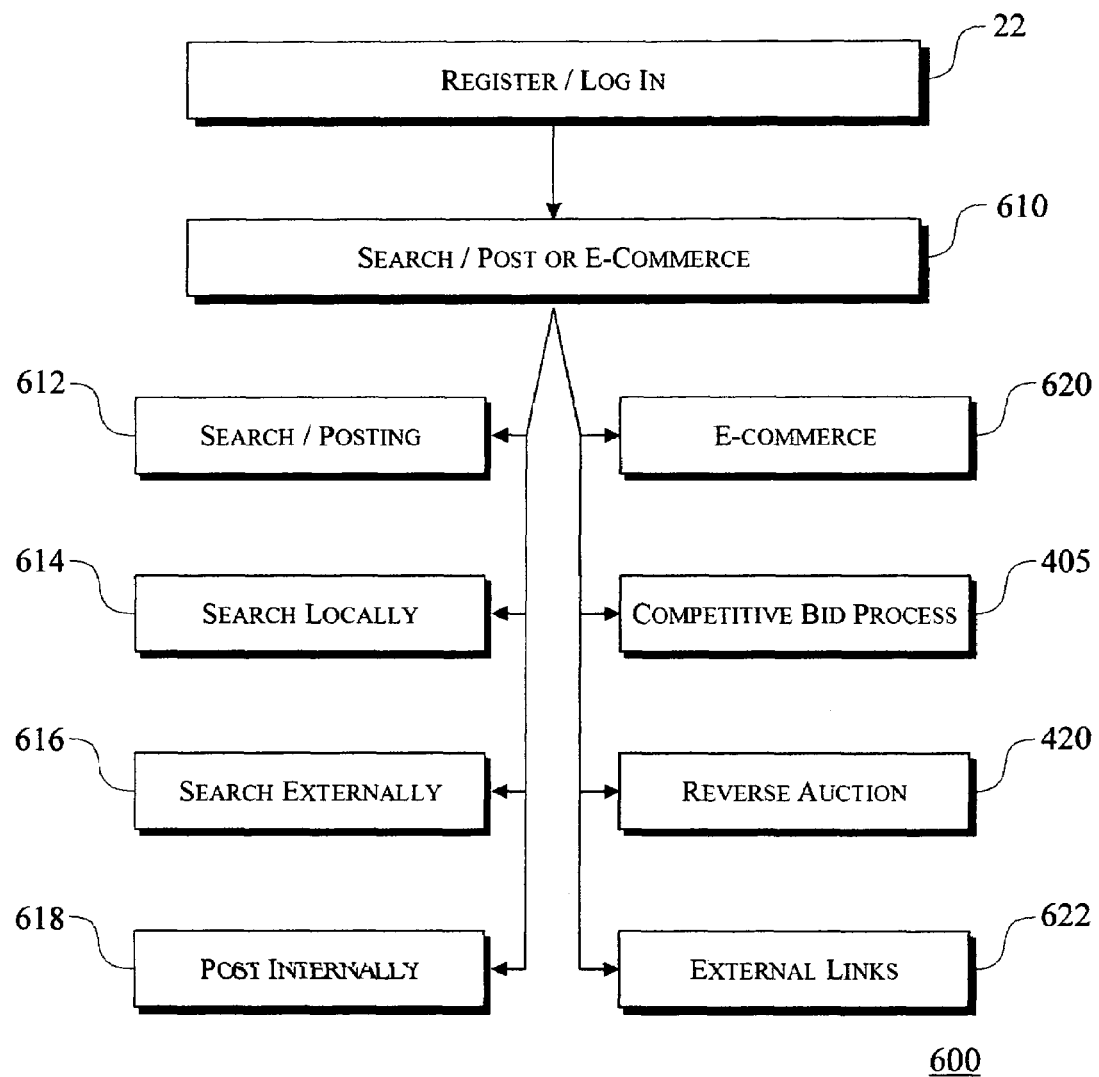
FIG. 8 illustrates the utilization of a portal in conjunction with the present invention.

FIG. 8 illustrates the utilization of a portal in conjunction with the present invention. The user would register, log in, or log on 22 to the web site. The web site would provide links to various options, whereby the links would be preferably in the form of buttons. Two options 610 may be to either search or post 612 an asset or utilize an e-commerce feature 620. The user would select the search/posting 612 link and have several options available. These options may include searching locally 614, search externally 616, or posting internally. Internal use would be respective to the managed database associated with the web site. External use would be use respective to an externally managed database. This would be beneficial to the user as the web site provider would be able to form alliances with other web site providers with similar databases such as lost and found. The alliances would also provide for external users to link to the internal database. The user may select the e-commerce 620 option, whereby the e-commerce option would provide various means for the user to complete transactions to procure assets. The desirable scenario would be to provide various e-commerce solutions to replace items that are missing or stolen. Examples of such e-commerce solutions include competitive bid process 405, reverse auctions 420, or links to other web sites 622. An additional feature would be the ability for a web site operating company to contact a respective party who has lost or had an asset stolen, with the contact being provided as a means to offer a replacement for sale.

Figure 9:
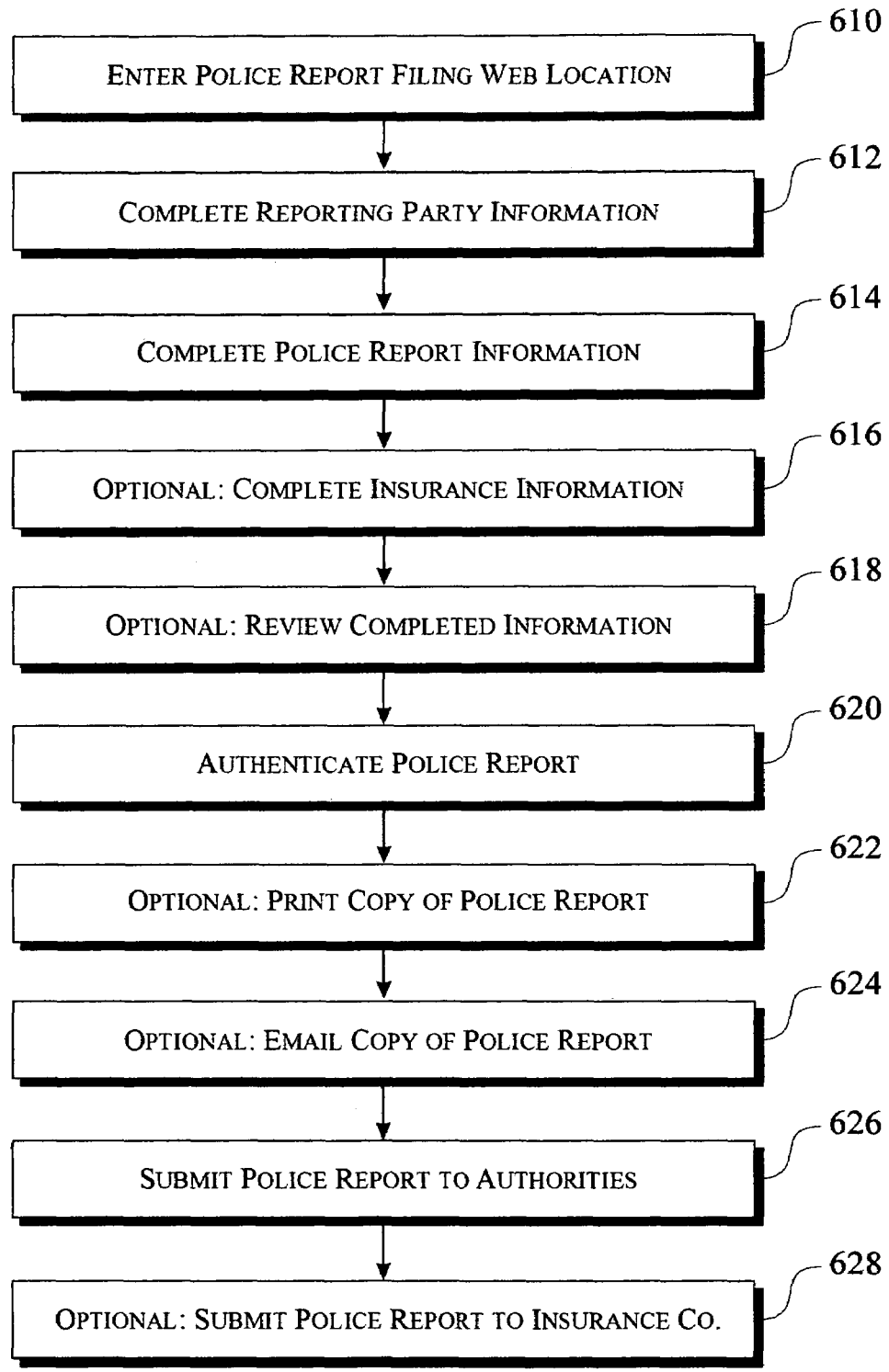
FIG. 9 illustrates a flow diagram representative of the process for filing a police report.

FIG. 9 illustrates a Police Reporting flow diagram 600 wherein any individual can file a police report via the internet. A person would enter a police report filing web location via any known method for accessing an internet based program in accordance with a enter police report filing location step 610. The reporting party would then complete the reporting party information section of the police report in accordance with a reporting party information submission step 612. The reporting party will then complete the information for the police report in accordance with a complete police report information step 614. Such information can include items stolen, items missing, missing persons, auto accidents, vehicle accidents, and the like. Additional information that can be submitted includes make, model, and serial number of an item. Further, photos, descriptions, and the like can be submitted for items such as jewelry and artwork or other items that would normally be more descriptive and unique. Such information can be retrieved from a person's file records of their personal property. Said reporting party can optionally provide insurance information in accordance with an optional insurance information submission step 616. Alternatively, said insurance information can be automatically provided from said person's file records of their personal property. Upon completion of the information to be submitted for the police report, it would be preferred to review the completed information, as in accordance with an optional review of completed information step 618. To provide a legal submission, it would be strongly urged to include an authentication process in accordance with an authenticate police report step 620. The authentication process can be any of many known means currently utilized or those that may be developed in the future. The means for authenticating said police report should not limit the spirit or scope of the present invention. Said reporting party can then optionally print a copy of said police report for their records in accordance with a printing police report step 622. Another option would be to email a copy of said police report to one or more email addresses in accordance with an optional email copy of police report step 624. Upon completion, said reporting party would conclude the report by submitting said police report to the respective authorities in accordance with a submit police report step 626. Additionally, an optional step of submitting a copy of said police report to the insurance company (respective to the information provided in said insurance information submission step 616), in accordance with an optional submit police report to insurance company step 628. Upon submission, each receiving party can provide a receipt of submission back to the reporting party, insurance company, victim, and the like. Said receipt of submission can be in any variety of formats, including email, hard copy, voice mail, text message, posting on said website, and the like.

Figure 10:
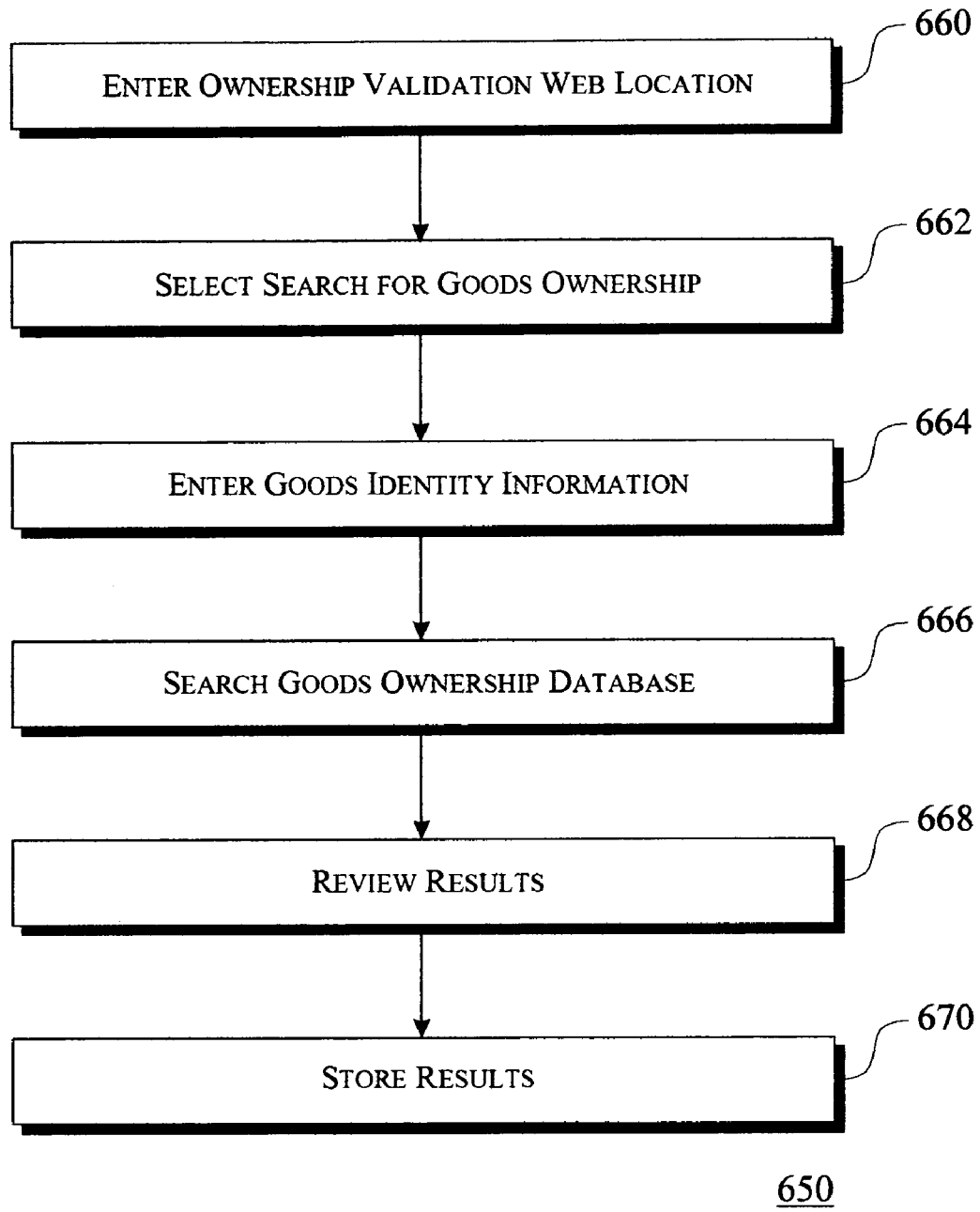
FIG. 10 illustrates a flow diagram representative of the process for validation of ownership of an item.

FIG. 10 illustrates a property ownership validation flow diagram 650 wherein any individual can validate the ownership of an item via a process of checking at least one of a stolen goods database and a proper ownership database. Each database can comprise at least one of respective to each item: a manufacturer, a model number, a UPC, an RFID tag, a serial number, a description, an electronic image of said item; and the like. A first step would be to access an ownership validation database such as via the Internet, in accordance with an access ownership validation database step 660. Said ownership database can be one that identifies stolen items, one that identifies the proper owner, and the like. It would be preferable that said ownership database be a single database or provide a means for accessing all known ownership databases via a single access point for ensuring the most complete search and accurate results. Upon accessing said database, one would initiate a search for a specific item or several items to ensure that the ownership is proper prior to taking the item for resale, in accordance with a select search for goods ownership step 662. Once selected, the user would enter any descriptive information to determine the proper ownership of an item or plurality of items in accordance with an item description entry step 664. Such information can include manufacturer, model, serial number, description, image, and the like. The software would then search the records to determine any potential matches in accordance with a search proper ownership database step 666. The results of the search would be presented to the user. The user would then review the results to determine if the ownership of an item is proper prior to resale of the item, as in accordance with a review search results step 668. As a means for maintaining records that the search was completed, the results would be stored in any of the various known methods, such as a hardcopy print, a softcopy file, an email, a file on a website, and the like, as in accordance with a store search results step 670. The described process can be utilized for items being resold via an internet resale site, an internet auction site, a pawnshop, and the like. The internet companies can include a requirement for a submitting party (seller) to require make, model, and serial number of an item, require that the information be authenticated or certify accuracy, then the system would search the ownership database for proper ownership. If it is determined that the ownership of the item is acceptable for resale, the process would continue. If it were determined that the item ownership was suspect, it would reject the submission. The search results would be stored to provide evidence that such a search was reported and the reseller has done sufficient diligence pertaining to reselling an object as an agent of the proper owner. Said stolen goods database can be created automatically from a police report database. A single, nationwide or worldwide stolen goods database can be created automatically from a plurality of police report databases. Additionally, should the software be able to determine the assumed proper owner, the assumed proper owner can be notified of the attempted resale of the item(s).

The Applicants have provided a business model, with several options for utilizing a database of stolen goods as an operating premise. The use of a stolen goods database as a business focal point has not been taught in prior art known by the Applicants. A publicly accessible database of stolen goods is also not known by the Applicants at the time of submission. The Applicants feel the utilization of the internet for a stolen goods database provides for improved timeliness in registering stolen assets and distributing the information. The internet further provides a means to globally distribute the information. The Applicants have taught advantages to applying the database for missing or stolen assets to a business model for assisting in replacing the assets not recognized by others. The Applicants have taught advantages to utilizing the internet as the internet can provide a means to communicate with the insurance company for simplifying claim processing.

What is claimed is:

1. A method of validating proper ownership of an item, the method comprising the steps:

establishing an ownership validation database;

filing a police report including information regarding a change in possession of an item, and including ownership identification information of said item;

automatically appending said ownership validation database directly with information submitted in said police report, wherein said ownership validation database includes said identification information of said item;

having at least one of a pawnbroker and reseller access said ownership validation database;

entering information to determine if an item subject to resale is included in said ownership validation database;

searching said ownership validation database to determine at least one of:

if said item subject to resale is included in the ownership validation database, if the item subject to resale is listed as stolen, and if said item subject to resale is being offered by a listed owner identified in the ownership identification information;

providing results of said search of said ownership validation database;

determining if the ownership is proper;

interacting with a world wide website portal to access a police report database;

entering information respective to a police report solely using a world wide web portal site, having access to a police report database;

storing entered information respective to the police report; and including information obtained from at least one list from a group of listings, the group of listings consisting of: stolen goods, missing goods, and recovered goods.

2. A method of validating proper ownership of an item as recited in claim 1, wherein the information is obtained from a list of stolen goods.

3. A method of validating proper ownership of an item as recited in claim 1, wherein the information is obtained from a list of missing goods.

4. A method of validating proper ownership of an item as recited in claim 1, wherein the information is obtained from a list of recovered goods.

5. A method of validating proper ownership of an item as recited in claim 1, wherein the information is obtained from a list of stolen goods and missing goods.

6. A method of validating proper ownership of an item as recited in claim 1, wherein the information is obtained from a list of stolen goods and recovered goods.

7. A method of validating proper ownership of an item as recited in claim 1, wherein the information is obtained from a list of missing goods and recovered goods.

8. A method of validating proper ownership of an item as recited in claim 1, wherein the information is obtained from a list of stolen goods, missing goods, and recovered goods.

\* \* \* \* \*